US008828540B2

(12) United States Patent
Schmidt et al.

(10) Patent No.: US 8,828,540 B2
(45) Date of Patent: Sep. 9, 2014

(54) SILICON CARBIDE CERAMIC CONTAINING MATERIALS, THEIR METHODS OF MANUFACTURE AND ARTICLES COMPRISING THE SAME

(75) Inventors: Wayde R. Schmidt, Pomfret Center, CT (US); Robert A. Barth, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 1397 days.

(21) Appl. No.: 11/455,049

(22) Filed: Jun. 16, 2006

(65) Prior Publication Data

US 2008/0003357 A1    Jan. 3, 2008

(51) Int. Cl.
| | | |
|---|---|---|
| D02G 3/00 | (2006.01) | |
| B32B 3/04 | (2006.01) | |
| B32B 18/00 | (2006.01) | |
| B32B 15/00 | (2006.01) | |
| C04B 35/00 | (2006.01) | |
| C04B 35/51 | (2006.01) | |
| C04B 35/56 | (2006.01) | |
| C04B 35/628 | (2006.01) | |
| C04B 35/573 | (2006.01) | |
| C04B 35/622 | (2006.01) | |

(52) U.S. Cl.
CPC ......... C04B 35/573 (2013.01); C04B 35/62884 (2013.01); C04B 2235/614 (2013.01); C04B 2235/5248 (2013.01); C04B 2235/6562 (2013.01); C04B 2235/6586 (2013.01); C04B 35/62272 (2013.01); C04B 2235/5244 (2013.01); C04B 35/62281 (2013.01); C04B 2235/5264 (2013.01); C04B 2235/6565 (2013.01); C04B 2235/656 (2013.01); C04B 35/62878 (2013.01); C04B 35/62873 (2013.01); C04B 35/62876 (2013.01)
USPC .......... 428/367; 428/74; 428/293.4; 428/379; 501/94; 501/90

(58) Field of Classification Search
None
See application file for complete search history.

(56) References Cited

U.S. PATENT DOCUMENTS

| | | | | | |
|---|---|---|---|---|---|
| 4,850,729 | A | * | 7/1989 | Kramer et al. | 401/183 |
| 5,075,160 | A | * | 12/1991 | Stinton et al. | 442/247 |
| 5,133,494 | A | * | 7/1992 | Wang et al. | 228/122.1 |
| 5,205,970 | A | | 4/1993 | Brun et al. | |

(Continued)

FOREIGN PATENT DOCUMENTS

| | | | | | |
|---|---|---|---|---|---|
| DE | WO 99/028272 | * | 6/1999 | | C04B 38/06 |
| EP | 1626036 A1 | * | 2/1996 | | C04B 35/573 |
| JP | 05-148025 | | 6/1993 | | |
| WO | WO 02/052086 A2 | | 7/2002 | | |

OTHER PUBLICATIONS

Math and Science Center: http://www.edinformatics.com/math_science/states_of_matter.htm (Copyright 1999).*

(Continued)

Primary Examiner — David Sample
Assistant Examiner — Nicole T Gugliotta
(74) Attorney, Agent, or Firm — Bachman & LaPointe, P.C.

(57) ABSTRACT

A process for manufacturing an article includes the steps of applying a quantity of a refractory metal sufficient to produce a coating on a carbon based felt; processing thermally a refractory metal coated carbon based felt at a temperature and for a period of time sufficient to form a ceramic based felt; and cooling the ceramic based felt under a controlled atmosphere.

16 Claims, 11 Drawing Sheets

(56) References Cited

U.S. PATENT DOCUMENTS

| | | | |
|---|---|---|---|
| 5,242,710 A * | 9/1993 | Claar et al. | 427/248.1 |
| 5,316,851 A * | 5/1994 | Brun et al. | 428/379 |
| 5,324,541 A | 6/1994 | Shuford | |
| 5,326,595 A | 7/1994 | Shuford | |
| 5,352,272 A * | 10/1994 | Moll et al. | 96/9 |
| 5,453,324 A | 9/1995 | Shuford | |
| 5,518,816 A | 5/1996 | Shuford | |
| 6,062,075 A | 5/2000 | Ritz et al. | |
| 6,547,967 B1 * | 4/2003 | Adler et al. | 210/500.25 |
| 6,551,569 B1 * | 4/2003 | Christian et al. | 423/440 |
| 6,627,126 B2 * | 9/2003 | Schmidt et al. | 264/29.1 |
| 2002/0094426 A1 | 7/2002 | Stepanian et al. | |
| 2003/0132558 A1 * | 7/2003 | Schmidt et al. | 264/625 |
| 2005/0118392 A1 * | 6/2005 | Millard et al. | 428/131 |
| 2005/0276961 A1 * | 12/2005 | Sherwood et al. | 428/292.1 |

OTHER PUBLICATIONS

G. J. McDougall, "The physical nature and manufacture of activated carbon", J. S. Afr. Inst. Min. Metall., vol. 91, No. 4, Apr. 1991, pp. 109-120.*

MiaoLing et al. (Sci China Ser E-Tech Si, Apr. 2009, vol. 52, No. 4, pp. 871-877).*

American Heritage Dictionary (copyright 2007), definition of "felt".*

Japanese Office Action for 2007-139831, dated Apr. 27, 2010.

* cited by examiner

FIG. 13D 1450°C
FIG. 13C 1350°C
FIG. 13B 1250°C
FIG. 13A Baseline Si coating on C fiber

SILICON CARBIDE CERAMIC CONTAINING MATERIALS, THEIR METHODS OF MANUFACTURE AND ARTICLES COMPRISING THE SAME

FIELD OF THE INVENTION

The invention relates to ceramic materials and, more particularly, the invention relates to a silicon carbide ceramic containing material.

BACKGROUND OF THE INVENTION

Advanced propulsion and combustion applications require materials with thermal and compositional stability in aggressive environments above 1200° C. Silicon carbide (SiC) is a particularly useful material because of its relatively high strength, low density, high thermal conductivity and oxidative resistance. Typical applications for SiC include ceramic composite reinforcement, ceramic armor, turbine components, barrier coatings, catalytic structures and heat exchangers. For some of these applications, controlled porosity, including oriented pores, within a SiC structure would enable a weight reduction (e.g., for use in armor, composites), an ability to provide desired anisotropic properties or a superior flow field for heating or cooling fluids with lower pressure drop (e.g., for use in catalytic supports, heat exchangers, reactors).

Figure 1:
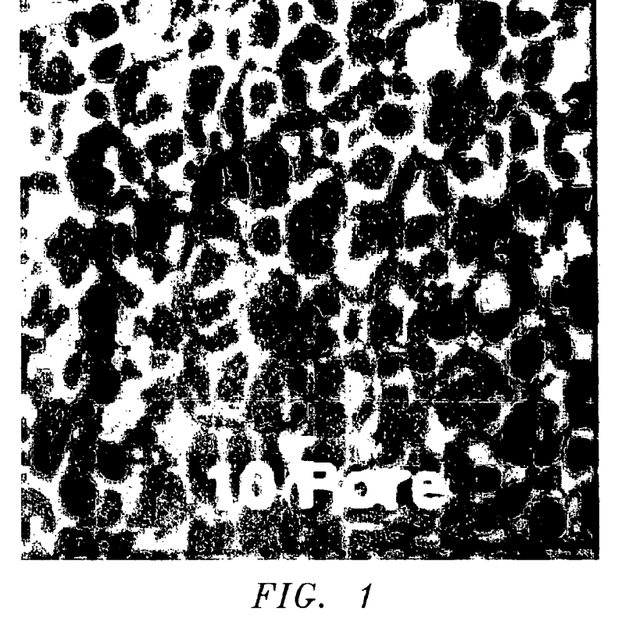
FIG. 1 is a representative microphotograph of a reticulated ceramic foam of the prior art having a 10 pore-per-inch density.

Ceramic foam containing SiC is typically created by infiltrating a ceramic-containing slurry throughout a polymer foam, followed by burnout of the polymer foam and post-densification of the slurry to form the desired reticulated ceramic foam (FIG. 1). This product contains oxide bonding between SiC particulate to form the foam structure, and does not exhibit the ideal characteristics of SiC because of the residual oxide phase required to produce such a foam. Ceramic foam products derived from SiC particulate are commercially available from Porvair PLC, Norfolk, United Kingdom, and their business Selee Corporation, Hendersonville, N.C.

Figure 2:
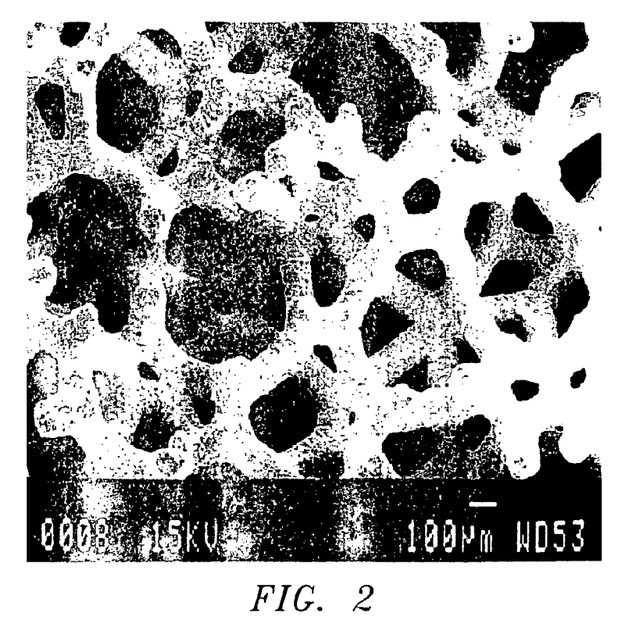
FIG. 2 is a representative microphotograph of a reticulated ceramic foam of the prior art produced using a chemical vapor infiltration process.

Ultramet of Pacoima, Calif., produces a similar reticulated SiC foam using a chemical vapor deposition or infiltration process (CVI) over a pyrolyzed carbon foam (FIG. 2). The carbon foam skeleton is derived from the pyrolysis of a thermosetting polymer foam, and the resulting rigid vitreous carbon structure is marketed as Ultrafoam. The Ultramet SiC products are produced by the vapor infiltration and deposition of SiC directly upon the pyrolyzed carbon reticulated foam skeleton. In this process, 10 to 1000 microns of ceramic is deposited on the carbon foam at elevated temperatures suitable for the desired deposition reaction. The carbon skeleton functions only as a substrate for the material being deposited. Following deposition, the carbon substrate core is removed, leaving behind voids within the ceramic struts. Ceramic foams ranging in density from 10 to 100 pores per inch are offered by Ultramet, corresponding to a typical pore size ranging from 250 microns to 2500 microns. This vapor deposition process is commonly performed within the industry using a chlorinated or methylchlorinated silane compound such as trichloromethyl silane, $Cl_3(CH_3)Si$, or related gaseous and/or liquid precursors to SiC, often in the presence of $H_2$ gas. The aforementioned Ultramet 'Ultrafoam' product provides physical properties closer to ideal SiC because of the material purity. However, when observing the microphotograph of FIG. 2, one of ordinary skill in the art will notice the relatively thick 'struts' of about 100 microns present in the Ultramet product. Such thick struts surround individual foam cells, which generally outline a void space having a polygonal shape. In addition, thick struts can prevent creation of a SiC structure that maintains a desirable balance of relatively high strength, lower stiffness, controlled porosity and pore geometry, high surface area and low density. Furthermore, struts that retain trapped void space and porosity can disadvantageously prevent access to functional surfaces, thereby diminishing desired properties.

Thus, there is a need for a porous SiC-containing article and a relatively low cost fabrication method suitable for creating such an article with controlled porosity.

SUMMARY OF THE INVENTION

In accordance with one aspect of the present invention, a process for manufacturing an article broadly comprises applying a quantity of a refractory metal sufficient to produce a thick coating on a carbon based felt; processing thermally a refractory metal coated carbon based felt at a temperature and for a period of time sufficient to form a ceramic based felt; and cooling the ceramic based felt under a controlled atmosphere.

In accordance with another aspect of the present invention, a composition broadly comprises a ceramic based felt comprising an optional refractory metal based coating or an optional carbon based coating.

In accordance with yet another aspect of the present invention, a composition broadly comprises a reaction product of a refractory metal and a ceramic based felt, wherein a quantity of the refractory metal present is greater than a quantity of carbon present during the formation of said reaction product, the reaction product broadly comprises a ceramic based felt having a refractory metal based coating.

In accordance with yet another aspect of the present invention, a composition broadly comprises a reaction product of a refractory metal and a ceramic based felt, wherein a quantity of the refractory metal present is less than a quantity of carbon present during the formation of said reaction product, the reaction product comprises a ceramic based felt having a carbon based coating.

In accordance with yet another aspect of the present invention, a composition broadly comprises a reaction product of a refractory metal and a ceramic based felt, wherein a quantity of the refractory metal present is stoichiometrically equivalent to a quantity of carbon present during the formation of the reaction product, the reaction product comprises a ceramic based felt substantially free of a coating.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Silicon carbide containing ceramic products possessing a porous network with relatively small pores, e.g., nominally about 100 microns or less, and small solid 'struts' relative to reticulated foam structures exhibit improved diffusion characteristics in small pores as well as the expected efficient flow properties within a fibrous network. Such silicon carbide containing ceramic products are relatively low-cost and possess a high surface area, which are favorable commercial and physical properties.

Figure 3:
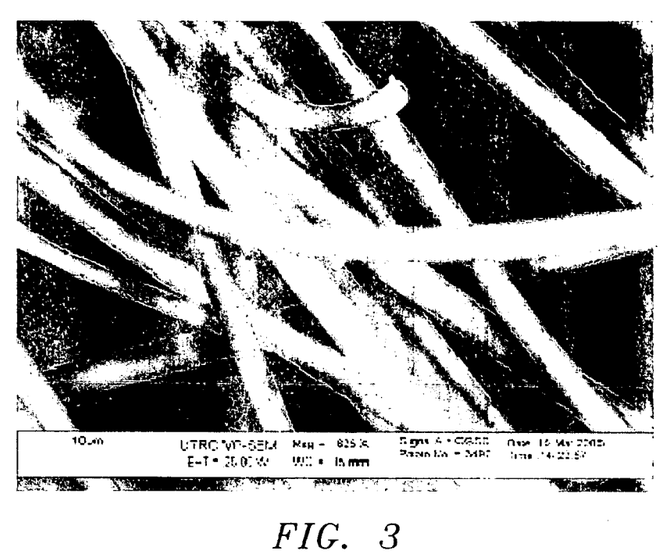
FIG. 3 is a representative microphotograph of activated carbon felt manufactured by American Kynol.
Figure 4:
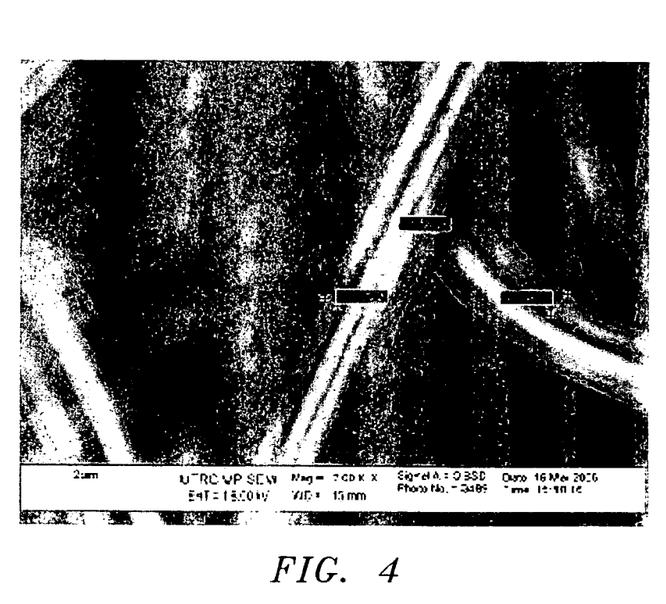
FIG. 4 is a representative microphotograph of activated carbon felt manufactured by Challenge Carbon Teks
Figure 5:
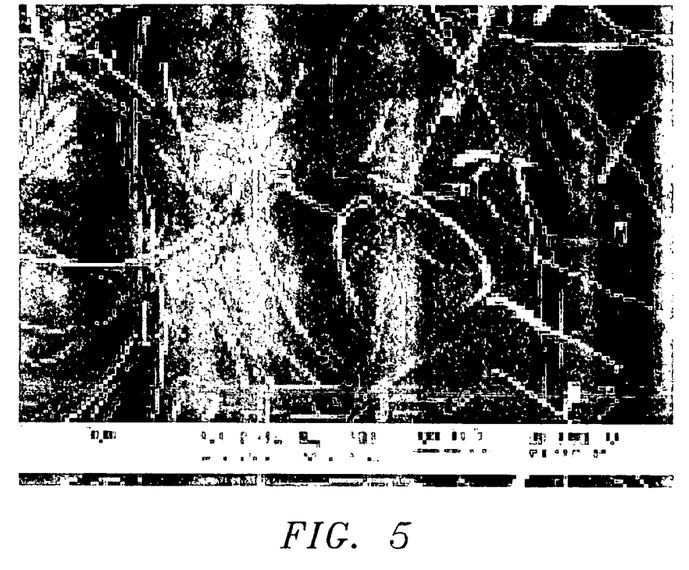
FIG. 5 is a representative electron microphotograph of activated carbon felt manufactured by CarboPur Technologies®.
Figure 6:
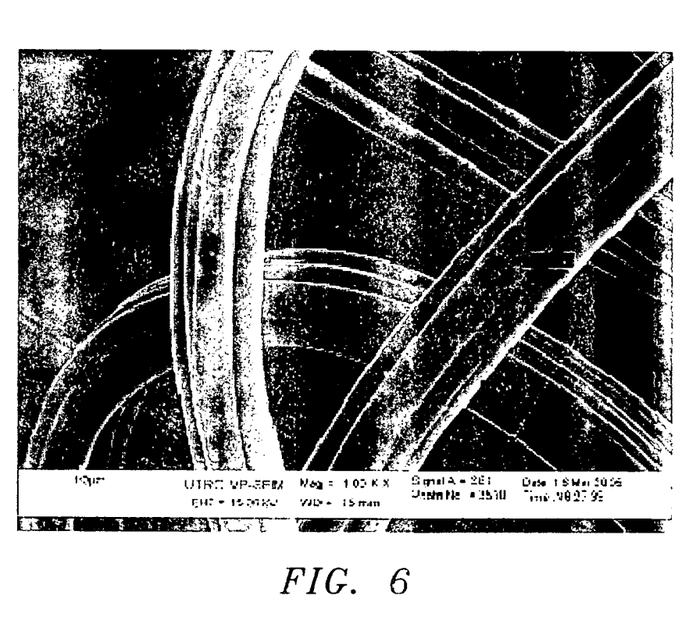
FIG. 6 is another representative electron microphotograph of a bundled form of activated carbon felt manufactured by CarboPur Technologies®.

The starting material for use in the process of the present invention is a carbon based felt and, more particularly, an activated carbon felt. Activated carbon felt (ACF) products are increasingly available in a variety of thicknesses and densities for purification of air and water, as well as materials for protection against chemical/biological/nuclear agents. Representative suppliers of relatively inexpensive, commercially available ACF products include American Kynol of Pleasantville, N.Y. (See FIG. 3); Challenge Carbon Teks of Taiwan (See FIG. 4); PICA Actitex of France, Freudenberg Nonwovens of Germany and CarboPur Technologies® of Montreal, Quebec, Canada (See FIGS. 5 and 6). Numerous other suppliers also provide activated carbon in commercially available fiber and fabric forms. CarboPur® felt exhibits uniform bundles of fluted/multi-lobed carbon fibers, nominally 15-25 microns in diameter, with individual fibers nominally 3-8 microns in diameter. Other ACF products have different fiber morphologies, one example being a felt comprised primarily of non fluted individual fibers with smooth surfaces, nominally 10-12 microns in diameter, another example being a felt comprised of non-uniform bundles with a fluted appearance, nominally 8-12 microns in diameter, with individual fibers nominally 1-3 microns in diameter.

Referring now to FIGS. 7A-7D, the carbon based felt may be coated with a refractory metal using any one of a number of techniques known to one of ordinary skill in the art. The refractory metal may include, but is not limited to, silicon, hafnium, tantalum, boron, tungsten, titanium, niobium, zirconium, mixtures thereof, and the like. Both line-of-sight and non-line-of-sight deposition methods may be utilized to provide a refractory metal layer. For example, suitable non-line-of-sight processes may include dipping in a slurry containing metal particles, sol-gel or polymeric precursor approaches to refractory metals, or electrophoretic techniques or electrostatic methods for plating refractory metals onto the felt, combinations comprising at least one of the foregoing, and the like. Suitable line-of-sight deposition methods may include chemical vapor deposition techniques, physical vapor deposition techniques, combinations comprising at least one of the foregoing, and the like.

Figure 7A:
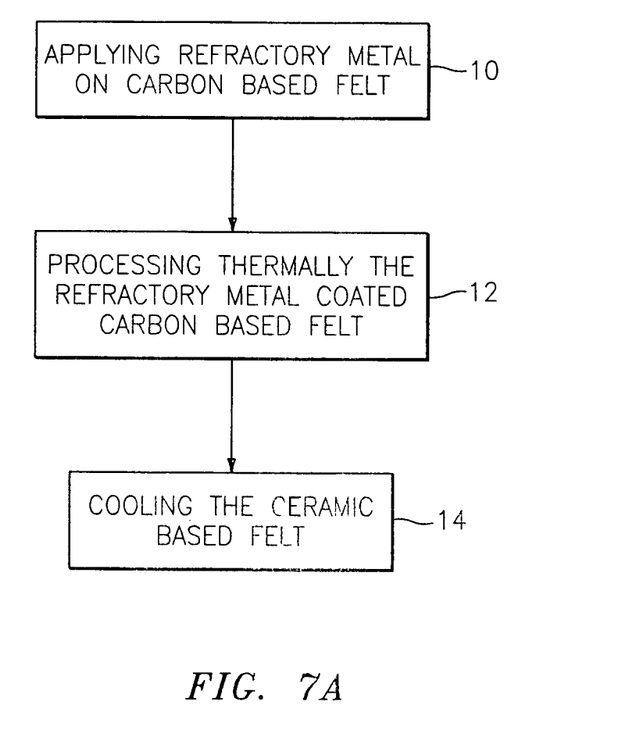
FIG. 7A is a representative flow chart of the process of the present invention.
Figure 7B:
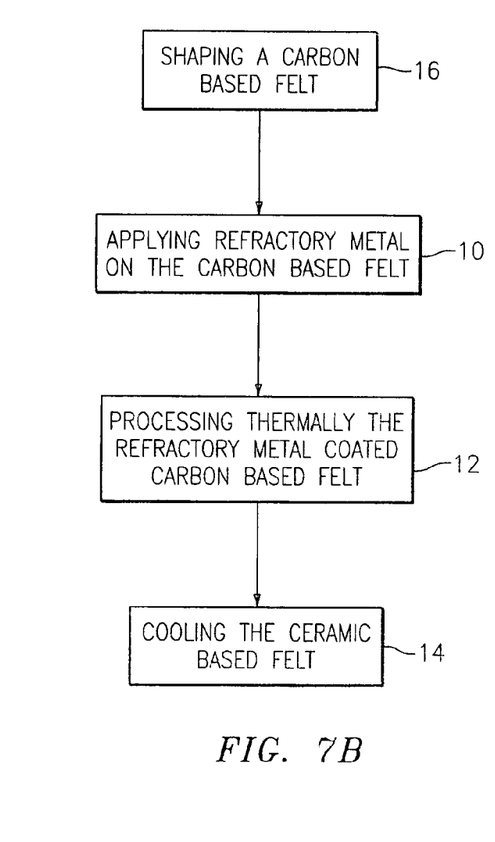
FIG. 7B is a representative flow chart of an alternative embodiment of the process of FIG. 7A.
Figure 7C:
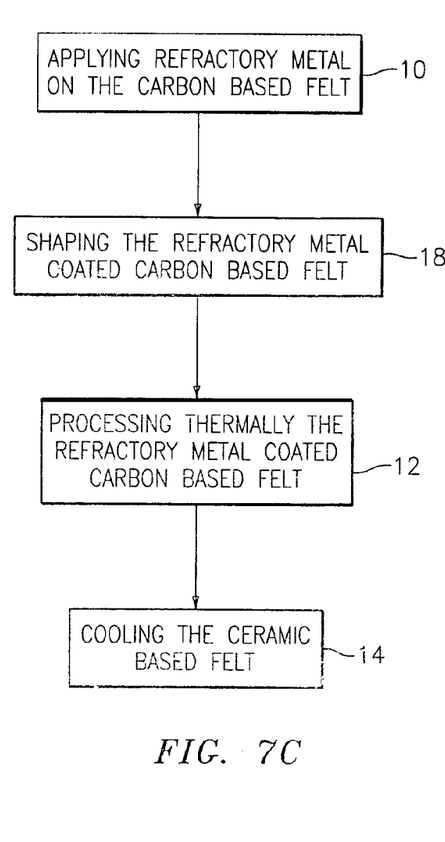
FIG. 7C is a representative flow chart of an alternative embodiment of the process of FIG. 7A.
Figure 7D:
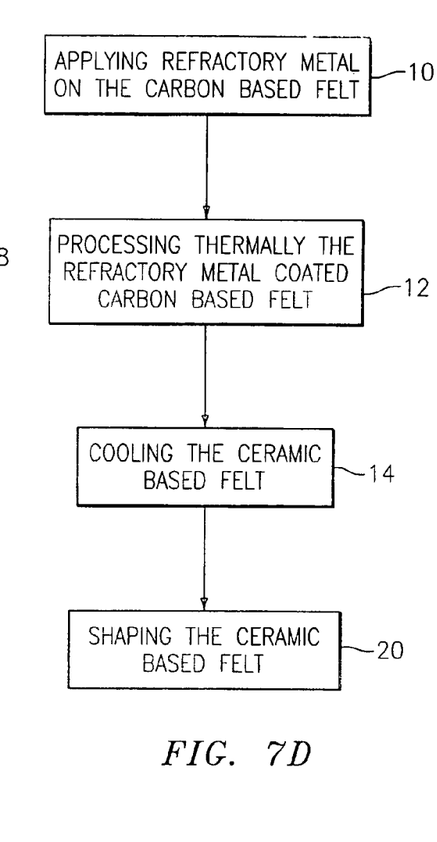
FIG. 7D is a representative flow chart of an alternative embodiment of the process of FIG. 7A.

For example, the refractory metal may be applied at a step 10 by a chemical vapor deposition (CVD) technique. The CVD technique generally comprises depositing said quantity of said refractory metal at a temperature of about 300° C. to about 1,200° C., preferably about 700° C. to about 1,000° C., and more preferably about 825° C. to 950° C., and a pressure of about 0.5 torr to about 20 torr, and preferably from about 1 torr to about 10 torr in the presence of a quantity of dichlorosilane that is being gradually flowed through the felt at a rate of about 0.050 liters per minute to about 2 liters per minute, preferably from about 0.050 liters per minute to about 0.50 liters per minute, and more preferably from about 0.070 liters per minute to about 0.1 liters per minute.

Dichlorosilane may be substituted with a variety of chlorinated compounds, including, but not limited to trichlorosilane ($SiCl_3H$), dimethyldichlorosilane ($SiCl_2(CH_3)_2$), trimethylchlorosilane ($Si(CH_3)_3Cl$) and tetrachlorosilane ($SiCl_4$), as well as a non-chlorinated reagent such as silane ($SiH_4$), and mixtures of these materials. The relative composition of the deposition gas can be controlled through the use of an optional addition of a diluent gas such as hydrogen. By controlling gas dilution, precursor composition, gas pressure, flow rate, deposition temperature and time, coatings substantially low in residual chlorine from the starting materials can be produced. As a result, the originally flexible carbon based felt became rigidized to a strong and stiff porous structure following the coating process.

The process of the present invention provides the flexibility to deposit thicker or thinner layers of refractory metal upon the carbon based felt as desired. Preferably, the refractory metal coating is uniform in thickness about the entire surface area of the carbon based felt. optionally, prior to applying the refractory metal, the carbon based felt may be shaped to a desired form or pre-form as shown at a step 16 of FIG. 7B. In the alternative, the refractory metal coated carbon based felt may be shaped to a desired form after applying the refractory metal as shown at a step 18 of FIG. 7C. In another alternative embodiment, the ceramic based felt may be shaped after cooling the ceramic based felt as shown at a step 20 at FIG. 7D.

After applying the refractory metal at step 10, the refractory metal coated carbon based felt may be thermally processed at a step 12 of FIG. 7A. The thermal processing may comprise a series of thermal processing steps performed in succession. For example, the refractory metal coated carbon based felt may be heat treated initially at a temperature of about 1250° C. that may be achieved at a rate of about 10° C. per minute under an inert atmosphere. The once heat treated refractory metal coated carbon based felt may be heat treated again at a temperature of about 1350° C. that may be achieved at a rate of about 10° C. per minute under an inert atmosphere. The twice heat treated refractory coated carbon based felt may be heat treated yet again at a temperature of about 1450° C. that may be achieved at a rate of about 10° C. per minute under an inert atmosphere. After each heat treatment step, the refractory metal coated carbon based felt may be cooled at a rate of about 20° C. per minute under an inert atmosphere as shown in a step 14 at FIGS. 7A-7D. The thermal processing may also comprise a single step. For example, the refractory metal coated carbon based felt may be heat treated at a temperature of 1,450° C. that may be achieved at a rate of about 10° C. per minute under an inert atmosphere. Alternate embodiments to the present invention can be described by varying experimentally controlled parameters including, but not limited to the rate of temperature increase/decrease during heating/cooling steps, the time spent at a given temperature and the maximum temperature reached.

The thermal processing technique causes the refractory metal coated carbon based felt to undergo chemical and material alterations such that the resultant reaction product is a ceramic based felt. Generally, the ceramic based felt may comprise a carbide of the refractory metal and an optional refractory metal coating or an optional carbon based coating or no coating at all. Preferably, it is most desirable to deposit a sufficiently thick layer of refractory metal upon the carbon based felt such that a stoichiometric ratio of carbon felt and refractory metal layer is produced, that is, a 1:1 equivalent amount of C and refractory metal prior to post-processing.

Figure 8A:
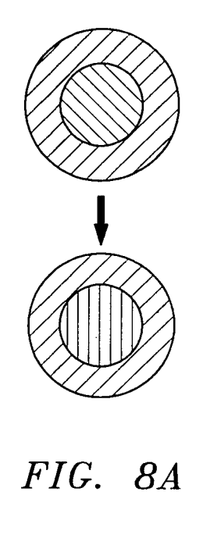
FIG. 8A is a schematic representation of a silicon carbide containing ceramic product of the present invention.
Figure 8B:
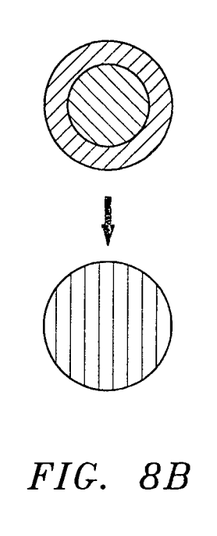
FIG. 8B is a schematic representation of another silicon carbide containing ceramic product of the present invention.
Figure 8C:
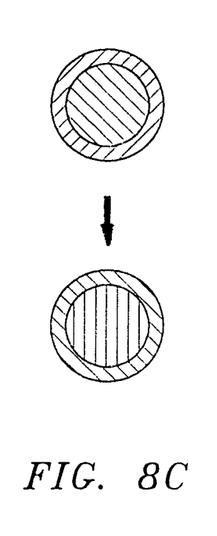
FIG. 8C is a schematic representation of yet another silicon carbide containing ceramic product of the present invention.

Referring now to FIGS. 8A-8C, alternate refractory metal coating thicknesses may be deposited depending on the desired ratio of the refractory metal carbide to excess refractory metal or excess carbon. Relatively thick refractory metal layers, that is, more refractory metal 22 available than carbon 24, will produce a refractory metal-rich structure with the refractory metal carbide upon conversion. As shown in FIG. 8A, a resultant refractory metal carbide fiber 30 includes a refractory metal coating 32 of substantially uniform thickness. In contrast, relatively thin layers, that is, an insufficient amount of refractory metal available to react with carbon, will produce refractory metal carbide plus excess unreacted carbon. As shown in FIG. 8C, a refractory metal carbide fiber 40 includes a carbon coating 42 of substantially uniform thickness. And, as shown in FIG. 8B, a substantially pure refractory metal carbide ceramic structure 50 will be produced when amount of refractory metal present in the coating is equivalent to amount of carbon present in the baseline fiber.

Experimental Section

CarboPur® activated carbon felt was coated with silicon in accordance with the CVD process described herein. Portions of the resulting Si-coated carbon felt were further heat treated in an argon atmosphere at temperatures of 1,250° C., 1,350° C. and 1,450° C., with heating rates at nominally 10° C. per minute and cooling rates at typically 20° C. per minute. After each heat treatment, the Si-containing ceramic felt was retrieved and examined using optical and electron microscopy. Attempts were made to manually 'bend or break' each sample by hand. However, each sample was too strong to easily fracture by hand. Samples were successfully fractured using pliers or following the introduction of defects onto the surface of the retrieved felt with a knife or diamond scribe. Optical microscopy results are provided in FIGS. 9A-9D and 10A-10D for the heat treated samples.

The micrographs show color changes in the materials and a reduction in fiber diameter with increasing temperature. The micrograph of the sample heated to 1450° C. shows brighter regions consistent with silicon-rich regions, perhaps due to 'pooling' of silicon during flow above its melting temperature (1410° C.) or possibly due to partial oxidation of silicon to $SiO_2$. At higher magnifications (FIGS. 10B-10D), the reduction of the fiber diameter is readily apparent and some surface texture becomes visible. Some 'webbing' between fibers also appears, presumably from silicon creep at elevated temperatures.

Figure 9A:
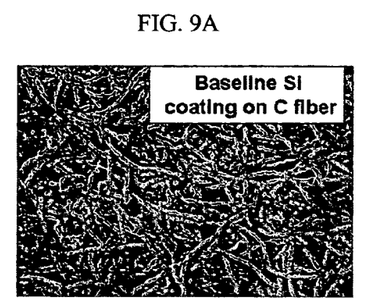
FIG. 9A is a representative optical microphotograph of a silicon coated silicon carbide containing ceramic product of the present invention.
Figure 9B:
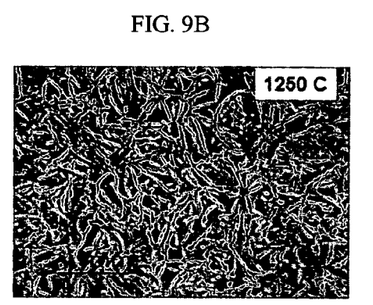
FIG. 9B is a representative optical microphotograph of the ceramic product of FIG. 9A after being heat treated to 1250° C. in accordance with the process of the present invention.
Figure 9C:
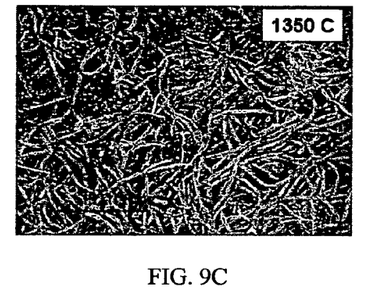
FIG. 9C is a representative optical microphotograph of the ceramic product of FIG. 9B after being heat treated to 1350° C. in accordance with the process of the present invention.
Figure 9D:
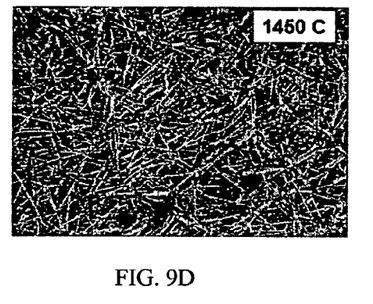
FIG. 9D is a representative optical microphotograph of the ceramic product of FIG. 9C after being heat treated to 1450° C. in accordance with the process of the present invention.
Figure 10A:
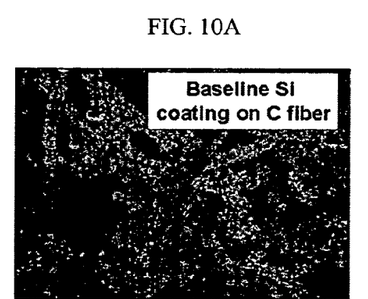
FIG. 10A is the representative optical microphotograph of FIG. 9A shown at a higher magnification.
Figure 10B:
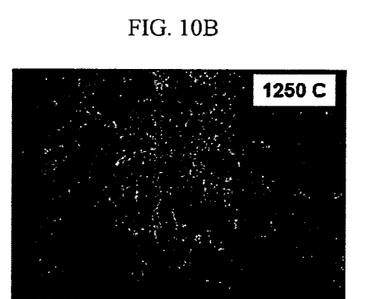
FIG. 10B is the representative optical microphotograph of FIG. 9B shown at a higher magnification.
Figure 10C:
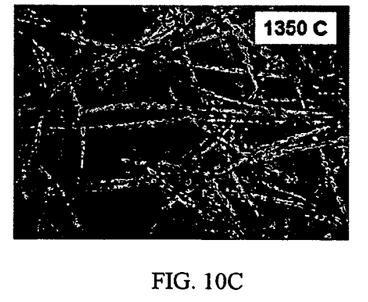
FIG. 10C is the representative optical microphotograph of FIG. 9C shown at a higher magnification.
Figure 10D:
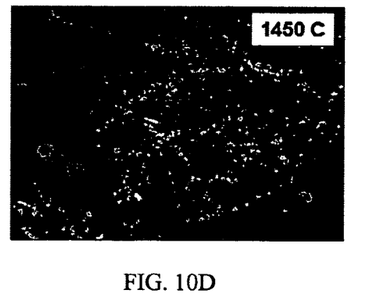
FIG. 10D is the representative optical microphotograph of FIG. 9D shown at a higher magnification.
Figure 11:
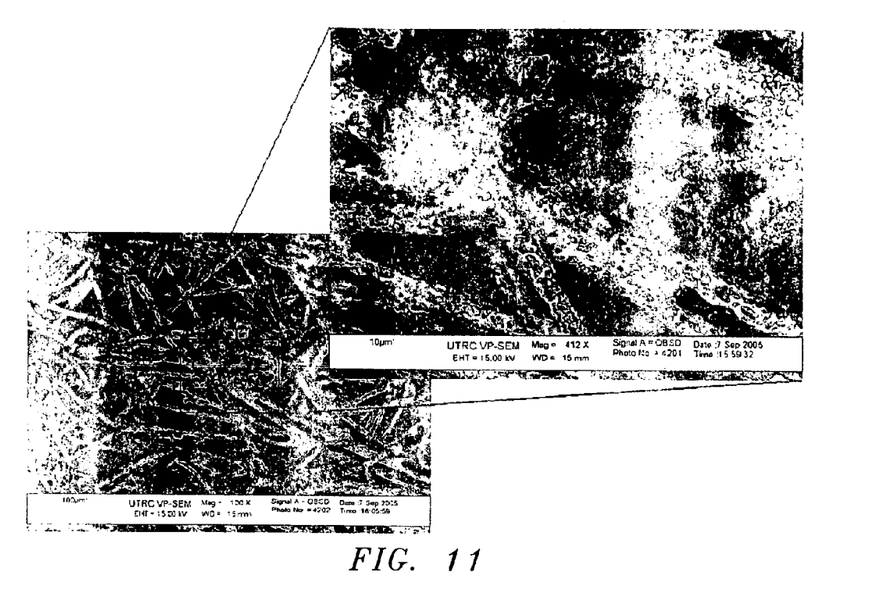
FIG. 11 is a representative electron microphotograph of the ceramic product of FIG. 9D.
Figure 12:
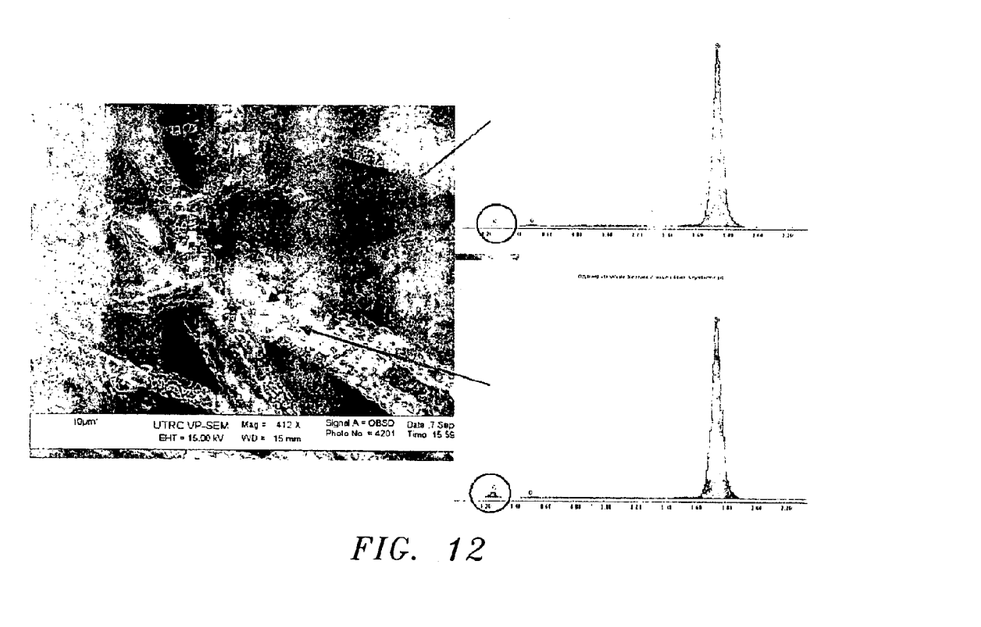
FIG. 12 is a representative microphotograph of the ceramic product of 9D and representative X-ray analysis of the ceramic product.
Figures 13A, 13B:
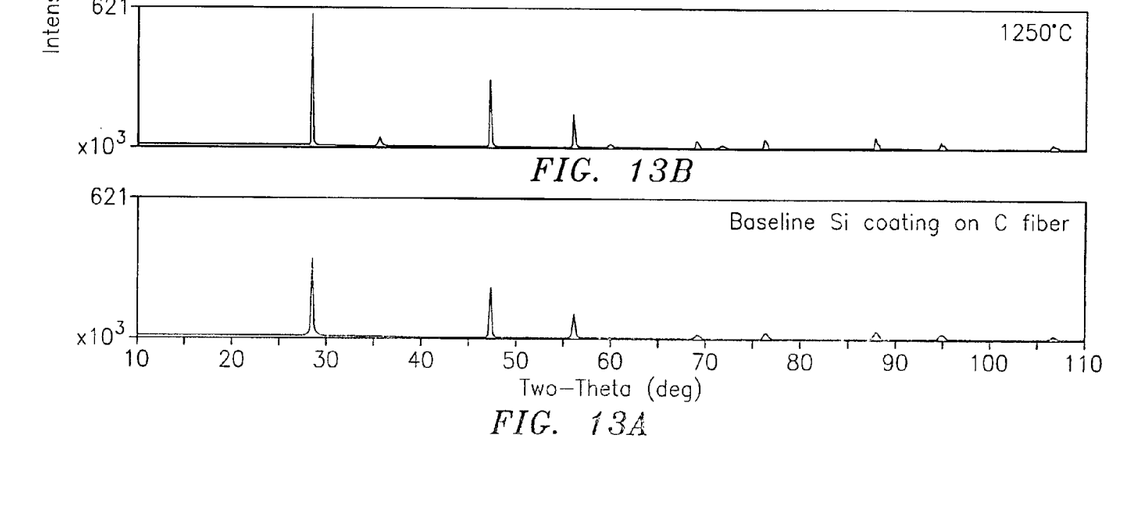
FIGS. 13A-13D are representative x-ray powder diffraction patterns of the ceramic products of FIGS. 9A-9D.
Figure 13C:
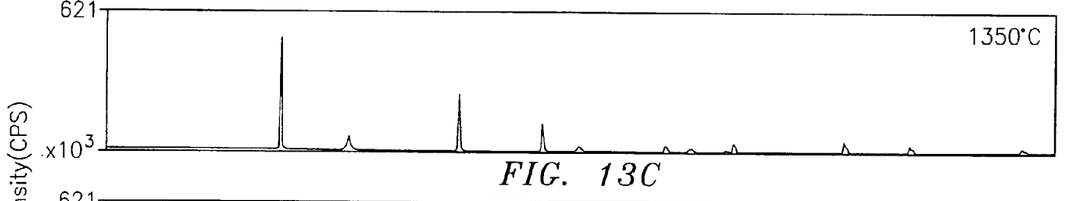
Figure 13D:
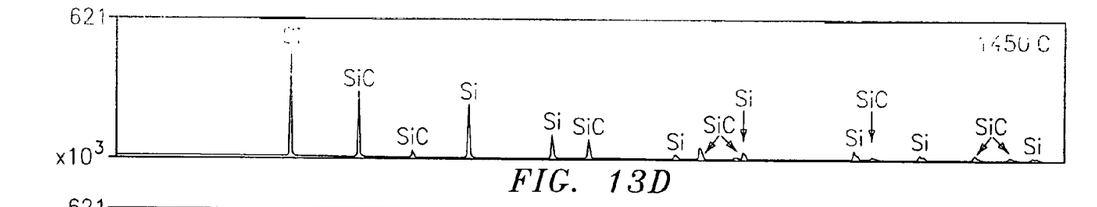

In an effort to confirm the growth of SiC phase from the Si-coated fibers, electron backscattered images were acquired on the sample heated to 1450° C. shown in FIG. 9D. FIG. 11 shows an electron micrograph of this sample and confirms that the fibrous nature of the starting material is retained. Higher magnifications show webbing between fibers and two primary phases—a brighter, smooth region and a darker, granular phase. X-ray mapping of these two regions (FIG. 12) identifies the smooth region as primarily excess silicon metal while the granular phase is consistent with stoichiometric SiC. The presence of the SiC granular phase provides texture and additional surface area to the underlying fiber support. Such added surface area can provide enhanced reactivity for catalytic applications or heat transfer. The porosity between fibers is also retained in the processed felt. In contrast to polygonal pores provided in commercially available reticulated foams, the pores provided in the current invention are irregular in shape and generally sized less than about 150 microns. The porosity is also somewhat aligned or elongated due to the orientation of the fibers within the felt. Elongated pores can advantageously extend residence time for flowing fluids.

Figure 14:
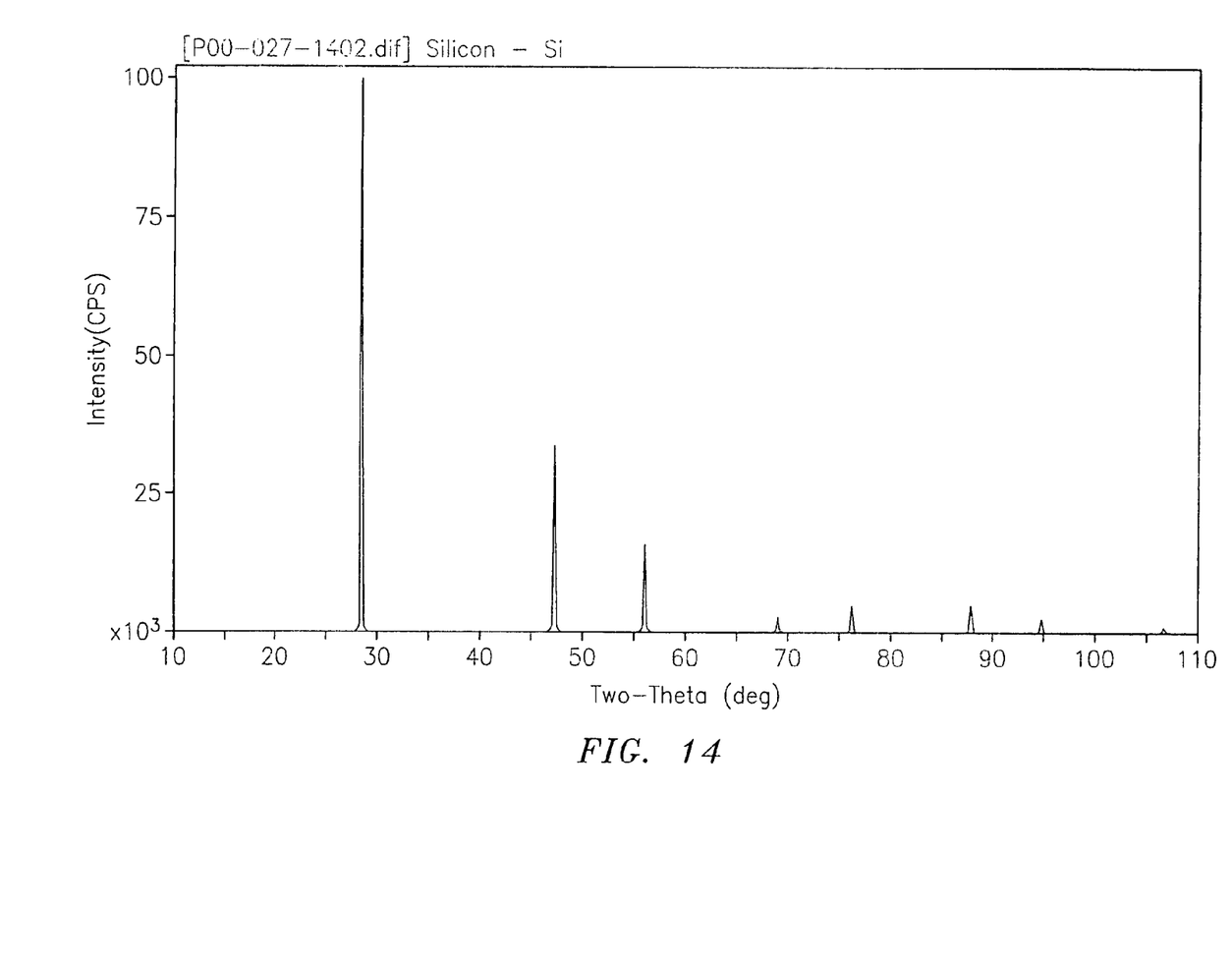
FIG. 14 is a representative X-ray powder diffraction reference pattern of silicon.
Figure 15:
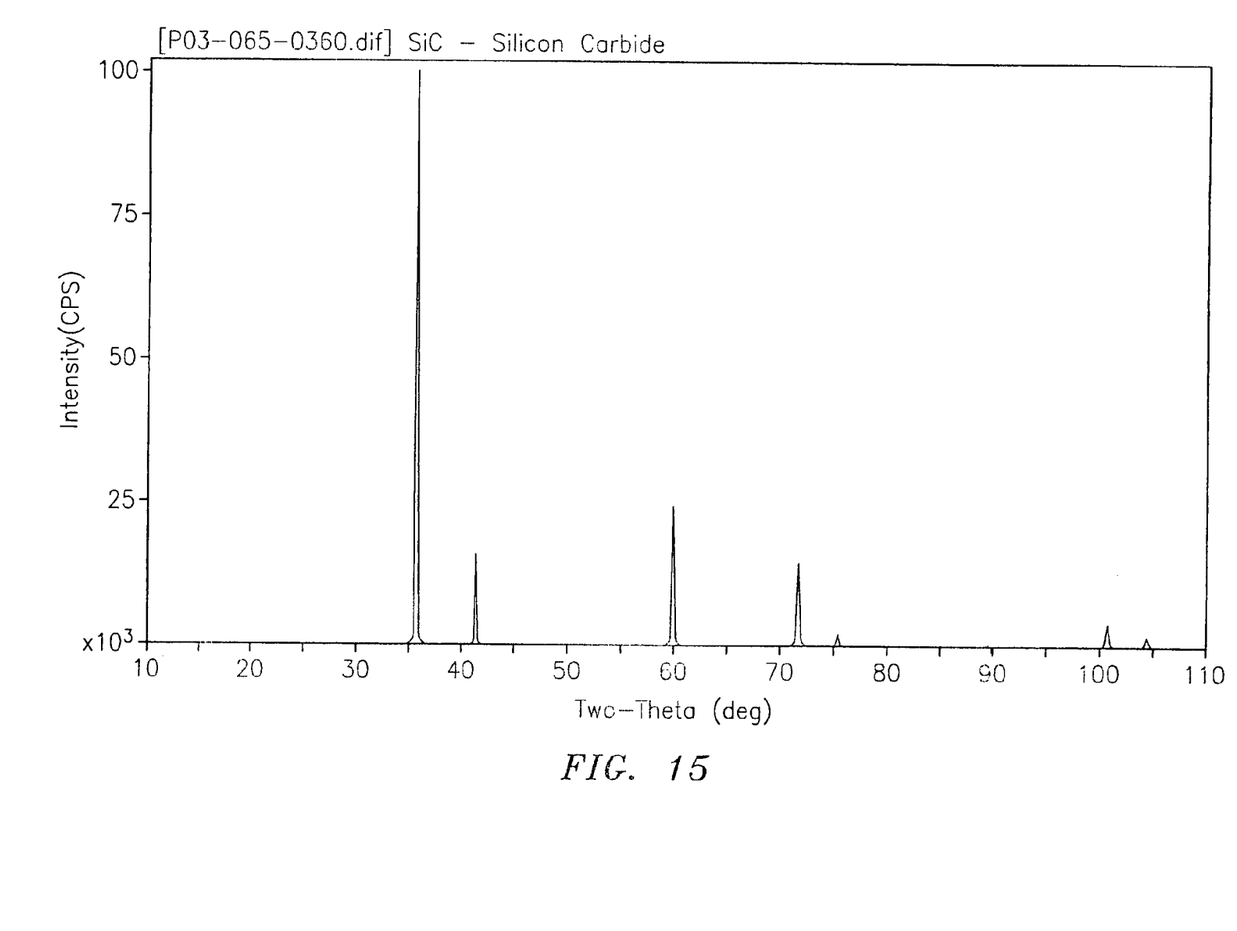
FIG. 15 is a representative X-ray powder diffraction reference pattern of silicon carbide.

Referring now to FIGS. 13A-13D, portions of the baseline Si-coated felt and the coated samples heated to various temperatures (shown in FIGS. 9A-9D) were separately ground to fine powders using a boron carbide mortar and pestle and individually analyzed by X-ray powder diffraction. The X-ray powder diffraction pattern for the baseline sample shows peaks consistent with elemental silicon, along with a minor peak near 27 degrees two theta from the carbon in the underlying felt. The samples heated to 1250° C., 1350° C. and 1450° C. each show new peaks consistent with the formation of silicon carbide, which grew in relative intensity with increased treatment temperature. The minor peak from the carbon in the underlying felt is absent in all patterns obtained from the heated samples. It is noteworthy that the presence of silicon carbide is confirmed initially in the X-ray pattern from the sample heated to 1250° C., which is about 160 degrees below the melting point of pure silicon. All peak positions and relative peak intensities were referenced against standard reference patterns of silicon (See FIG. 14) and silicon carbide (See FIG. 15) to confirm phase identification. The standard reference pattern (00-027-1402) of silicon was taken from the Metallic & Intermetallic database of the National Institute of Standards & Technology. The standard reference pattern (03-065-0360) of silicon carbide was taken from the Release 2004 database of the International Center for Diffraction Data.

The ceramic based felt of the present invention may be utilized in a variety of applications. Representative applications include, but are not limited to, the following: lightweight armor component (curved and angled shapes possible); polymer, metal, ceramic or hybrid matrix composite reinforcement for subsequent matrix infiltration; high temperature fuel filters; fluid purification; sealing structures, including abradable seals; braking components; catalytic supports, substrates or reactor components; heat exchangers; insulation components; and, barrier layers, offsets, or components of internal laminate structures.

The ceramic based felt of the present invention possesses numerous advantages over the prior art. For instance, the ceramic based felt may be manufactured using low cost, readily available starting materials such as carbon felts and fabrics available in a wide variety of densities. Secondly, the resulting ceramic based felt possesses a fibrous morphology offering higher surface area and improved flow versus conventional foam structures of the prior art. The composition of the ceramic based felt, that is, relative amounts of refractory metals, carbon and refractory carbides, may be varied easily throughout the process. Thirdly, the refractory metal coating does not need to melt in order to react with carbon fiber network. As a result, the process of the present invention utilizes lower processing temperatures than melt infiltration Si/SiC techniques of the prior art. Fourthly, the process of the present invention is far simpler than prior art fabrication techniques. Prior art fabrication techniques required applying SiC foams directly onto polymeric supports via CVD followed by removal of the polymer support. Lastly, the process of the present invention is readily scaleable and limited only by the CVD reactor size being employed.

The process and resulting composition and articles of manufacture of the present invention may be varied accordingly as is recognized by one of ordinary skill in the art. For example, various parametric improvements are possible using reducing vs. oxidizing atmosphere, vacuum modulation, humidification, exposure time, temperature and cycling. In addition, resulting composition(s) may also be modified in turn, for example, the extent of crystallinity, grain size, pore size and extent of porosity, etc. may be modified accordingly by varying the operating parameters of the process of the present invention. The process of the present invention may also be modified to prepare other ceramic felts (e.g., HfC, TaC, $B_{10}C$, WC, TiC, NbC, ZrC and mixtures thereof) using appropriate refractory metal CVD coatings onto carbon based felt.

Furthermore, the CVD of the refractory metal phase may be interrupted with alternate processing steps, e.g. alternate CVD composition deposition, slurry or dip coating, etc., prior to reaction of the refractory metal coating with carbon fibers. As long as the refractory metal coating is in contact with carbon fiber in order for reaction to proceed to create refractory ceramic.

Lastly, the converted felt may be post processed via coating or infiltration methods to modify and/or enhance physical properties, i.e. electrophoretic deposition of alternate ceramic phase to produce ceramic composite, etc.

One or more embodiments of the present invention have been described. Nevertheless, it will be understood that various modifications may be made without departing from the spirit and scope of the invention. Accordingly, other embodiments are within the scope of the following claims.

What is claimed is:

1. A composition, comprising: a rigid porous ceramic based felt having a refractory metal carbide layer and an optional refractory metal based coating or an optional carbon based coating, wherein said ceramic based felt has a plurality of solid struts and said ceramic based felt has a plurality of pores between adjacent fibers and said pores are irregularly shaped and elongated and have a size less than 150 microns.

2. The composition of claim 1, wherein said ceramic based felt further has said refractory metal based coating deposited and said refractory metal based coating deposited includes a refractory metal selected from the group consisting of silicon, hafnium, tantalum, boron, tungsten, titanium, niobium, zirconium and mixtures thereof.

3. The composition of claim 1, wherein said ceramic based felt has said carbon based coating and said ceramic based felt is a carbide of at least one refractory metal selected from the group consisting of silicon, hafnium, tantalum, boron, tungsten, titanium, niobium, zirconium, and mixtures thereof.

4. The composition of claim 1, wherein said refractory metal carbide layer comprises a carbide of at least one refractory metal selected from the group consisting of silicon, hafnium, tantalum, boron, tungsten, titanium, niobium, zirconium, and mixtures thereof.

5. A composition, comprising:
a reaction product of a refractory metal and a ceramic based felt, wherein a quantity of said refractory metal present is stoichiometrically equivalent to a quantity of carbon present during the formation of said reaction product,
said reaction product comprises a ceramic based felt formed from activated carbon and substantially free of a coating, wherein said ceramic based felt has a plurality of solid struts for providing diffusion characteristics.

6. The composition of claim 5, wherein said refractory metal is selected from the group consisting of silicon, hafnium, tantalum, boron, tungsten, titanium, niobium, zirconium and mixtures thereof.

7. The composition of claim 5, wherein said ceramic based felt is a carbide of at least one refractory metal selected from the group consisting of silicon, hafnium, tantalum, boron, tungsten, titanium, niobium, zirconium and mixtures thereof.

8. An article comprising a composition of claim 1.

9. An article comprising a composition of claim 5.

10. The article of claim 8, wherein said article is one of an armor component, a fuel filter, a fluid purification device, a sealing structure, an abradable seal, a catalytic support, a reactor component, a heat exchanger, an insulation component, and a barrier layer.

11. The article of claim 9, wherein said article is one of an armor component, a fuel filter, a fluid purification device, a sealing structure, an abradable seal, a catalytic support, a reactor component, a heat exchanger, an insulation component, and a barrier layer.

12. The composition of claim 1, wherein said ceramic base felt has a plurality of pores and each of said pores has a size no greater than 100 microns.

13. The composition of claim 1, wherein said ceramic based felt is made of activated carbon.

14. The composition of claim 1, wherein a stoichiometric ratio of carbon felt and refractory metal layer is 1:1 equivalent amount of carbon and refractory metal prior to post-processing.

15. The coating of claim 1, wherein said refractory metal coating layer has a thickness sufficient to provide more available refractory metal than available carbon.

16. The coating of claim 1, wherein said refractory metal coating layer has a thickness sufficient to provide less available refractory metal than available carbon.

* * * * *